United States Patent [19]

Neiley, Jr. et al.

[11] 3,915,438
[45] Oct. 28, 1975

[54] STREAM IMPINGEMENT MIX HEAD

[75] Inventors: Geoffrey C. Neiley, Jr., North Reading; Donald B. McIlvin, Danvers, both of Mass.

[73] Assignee: USM Corporation, Boston, Mass.

[22] Filed: July 1, 1974

[21] Appl. No.: 484,784

[52] U.S. Cl.................................. 259/7; 23/252 R
[51] Int. Cl.²........................................... B28C 7/04
[58] Field of Search........... 259/4, 8, 18, 23, 24, 7, 259/9, 10, 154, 148, 149, 164, 165, 161, 162; 137/606; 23/292, 252 R; 222/70, 134, 135

[56] References Cited
UNITED STATES PATENTS

| | | |
|---|---|---|
| 3,079,950 | 3/1963 | Rimsha................. 137/606 |
| 3,794,301 | 2/1974 | Simmonds.............. 23/252 |

*Primary Examiner*—Houston S. Bell, Jr.
*Attorney, Agent, or Firm*—Aubrey C. Brine; Vincent A. White; Richard B. Megley

[57] ABSTRACT

A method and apparatus are provided for mixing and dispensing multiple component materials wherein the materials may be supplied substantially continuously in controlled ratio in a substantially concurrent mixing and dispensing cycle, the mixing being accomplished first in a premix stage by impingement means and then in a mixing stage by agitator means wherein both impingement mixing and vortex flow mixing of the component materials are performed on the material in a single mixing head prior to dispensing the material into a mold.

22 Claims, 5 Drawing Figures

STREAM IMPINGEMENT MIX HEAD

BACKGROUND OF THE INVENTION

The present invention relates to apparatus and method for mixing and dispensing multiple component materials, and particularly to a method and apparatus for mixing and dispensing multiple component material compositions wherein the mixing is accomplished by both impingement of the component materials and by agitation of the materials performed in sequence.

In the past, prior art devices have been disclosed which provide for the mixing and dispensing of multicomponent liquid materials, which devices have features relating to the metering, mixing and dispensing of the material in both batch and continuous modes. Such devices are disclosed in U.S. Pat. Nos. 3,409,174, 3,632,022, 3,642,175 and 3,794,301, which are assigned to the assignee of the present invention. The devices are generally provided for use in the mixing and dispensing of a polyurethane composition, and the utilization of component ingredients including a plyhydroxyl composition and an isocyanate composition which are sequentially fed to a mixing chamber in a predetermined ratio. The prior art devices also include means whereby the ratio at which the compositions are fed to the mixing chamber is varied, in means whereby the total quantity of the constituent compositions fed to the mixing chamber may be varied. Among these devices there is also included means for varying the volume of the mixing chamber, and means wherein the constituent ingredients are fed substantially contemporaneously in a predetermined controllable ratio to the mixing chamber, the mixed material being dispensed from the chambers substantially contemporaneously with mixing. A typical arrangement of this last mentioned type is disclosed in the U.S. Pat. No. 3,794,301 cited above.

While the method and apparatus depicted in the aforementioned U.S. Pat. No. 3,794,301 have proved successful in the metering and mixing of materials in the contemporaneous mode increased efficiency at high rates of discharge may be obtained by improvement in the mixing mode of the device. The efficiency of the mixing action imparted to the materials by an impeller in the mix chamber, as disclosed, is increased substantially by including a premix stage prior to the disclosed mixing operation.

The present invention has, therefore, as an object to provide a method and apparatus for mixing and dispensing a multiple component material wherein the efficiency and rate of mixing are greatly improved over prior art devices.

The present invention has a further object to provide a method and apparatus for mixing and dispensing a multicomponent material which provides better mixing capability for viscous systems and increases the efficiency of the mixing and dispensing system when used for large volume applications.

A further object of the present invention is to provide a method and apparatus for mixing and dispensing a multiple component material wherein the mixing is conducted through both a premixing and separately controllable mixing stage wherein the speed of agitator may be varied to vary the amount of mix energy imparted to the materials.

SUMMARY OF THE INVENTION

The present invention is directed to a method and apparatus for mixing and dispensing a multiple component liquid mixture wherein means is provided for supplying a first component ingredient to a mixing chamber in a metered quantity, means is provided for supplying a second component ingredient to the mixing chamber in a metered quantity, each of said component ingredients being passed through a premixing stage prior to entering the mixing chamber. Both the mixing and the premixing are carried on substantially concurrently with the supplying of first and second component materials, and the dispensing of the mixture from the chamber is further substantially concurrently carried out during the supplying, premixing and mixing of the component ingredients.

BRIEF DESCRIPTION OF THE DRAWINGS

For a more adequate understanding of the invention, reference should be made to the description of a preferred embodiment when read together with the accompanying drawing in which.

DESCRIPTION OF THE PREFERRED EMBODIMENT

Figure 1:
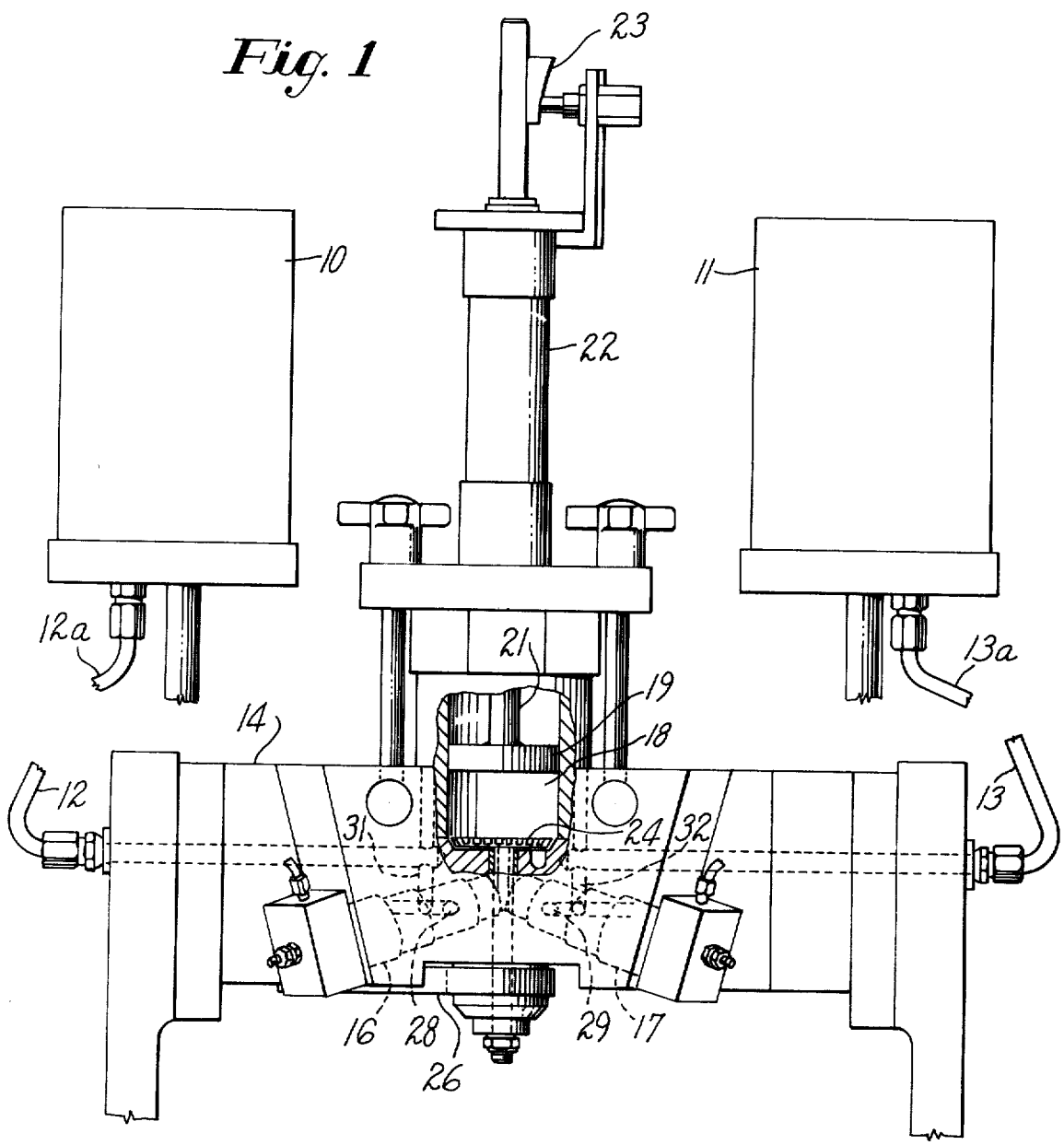
FIG. 1 is an elevational view, partially in section, showing a device for mixing and dispensing multiple component materials, constructed in accordance with the teachings of the present invention.

Referring now to the drawing, and in particular to FIG. 1, there is shown a device for the mixing and dispensing of a multiple component material which may be, for example, a polyurethane foam which is to be injected into a mold. Basic elements of the device include a polyhydroxyl tank 10 and a polyisocyanate tank 11 for storing the constituent materials. Each of the tanks 10 and 11 is connected through a pressure source by feed lines 12, 12a and 13, 13a respectively to a mix head 14 mounted on suitable support structure. Each of the lines 12 and 13 extend through the mix head 14 and are interconnected with a pair of transfer valves 16 and 17 which will be described in detail hereinbelow.

An opening is provided in the mix head 14 into which a cylindrical mix chamber 18 is accommodated together with its related operating elements. The mix chamber 18 is provided with a piston 19 connected to a rod 21 which extends into the injection actuator 22. The opposite end of the rod 21 extends beyond the actuator 22 and it is operatively linked with a position transducer 23 which is connected to control means for performing the sequence of operations, during a metering mixing and dispensing cycle.

At the bottom of the mixing chamber 18 there is disposed a multiple blade agitator in the form of impeller 24 supported for rotation in the cylinder, and rotated by motor means connected to a drive belt 26.

Figure 2:
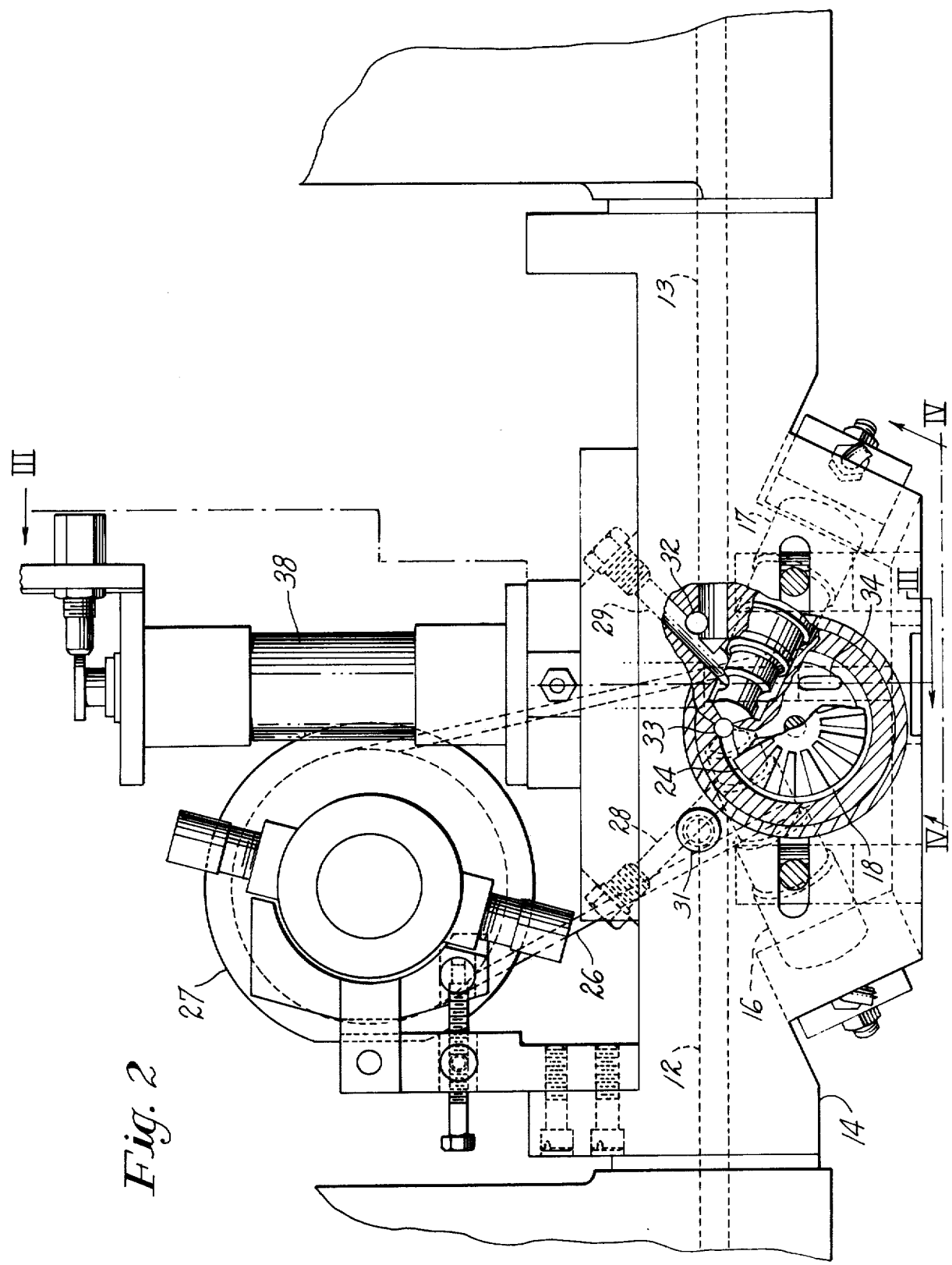
FIG. 2 is a fragmentary sectional plan view showing a portion of the structure of FIG. 1 taken on an enlarged scale for clarity.
Figure 3:
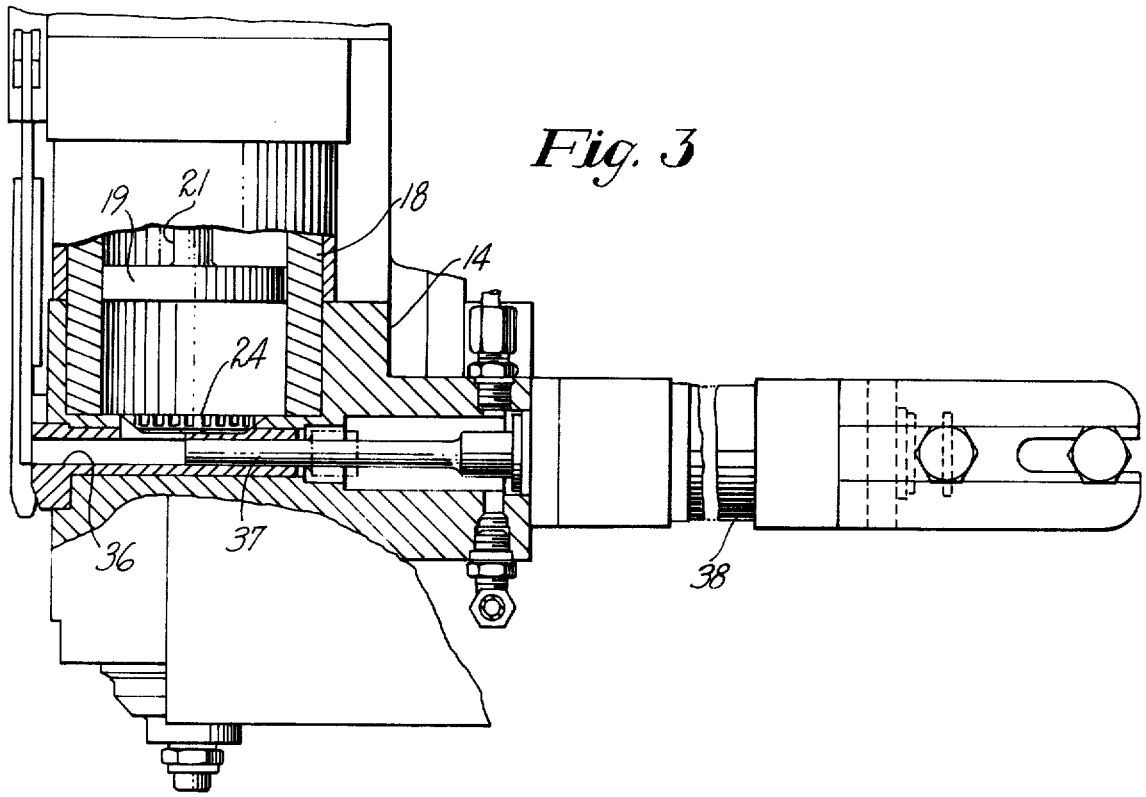
FIG. 3 is an elevational view, partially in section, taken along the line IV—IV of FIG. 2.

Referring now to FIGS. 2 and 3, it will be seen that in the present embodiment the motor means for driving the impeller 24 comprises an hydraulic motor 27 attached to the impeller shaft by a drive belt 26. It will further be noted that the feed lines 12 and 13 extend into the mix head 14 and terminate adjacent a pair of conduits 28 and 29 extending from the transfer valves 16 and 17. A pair of substantially vertical passageways 31 and 32 interconnect the conduits 28 and 29 respectively with the lines 12 and 13 to complete the flow path for the polyhydroxyl material and the polyisocyanate material, from the tanks 10 and 11 into the transfer valves 16 and 17, respectively.

As best seen in FIG. 2, the mixing chamber 18 is provided with a single inlet opening 33, and an outlet opening 34 leading to a sprue passage 36, which is shown in FIG. 3. The sprue passage 36 is provided with a sprue valve rod 37 actuated by a piston 38, the rod being movable to a position to close off the opening 34 in the mixing chamber 18, and to simultaneously clean the passage 36 of excess material.

The sprue device described above is similar to that shown in U.S. Pat. No. 3,669,600 issued to George F. MacLean and assigned to the assignee of the present invention. It is, therefore, considered unnecessary to discuss in detail the structure, or operation, of the device as such information is readily available from the teachings of the aforementioned patent.

Figure 4:
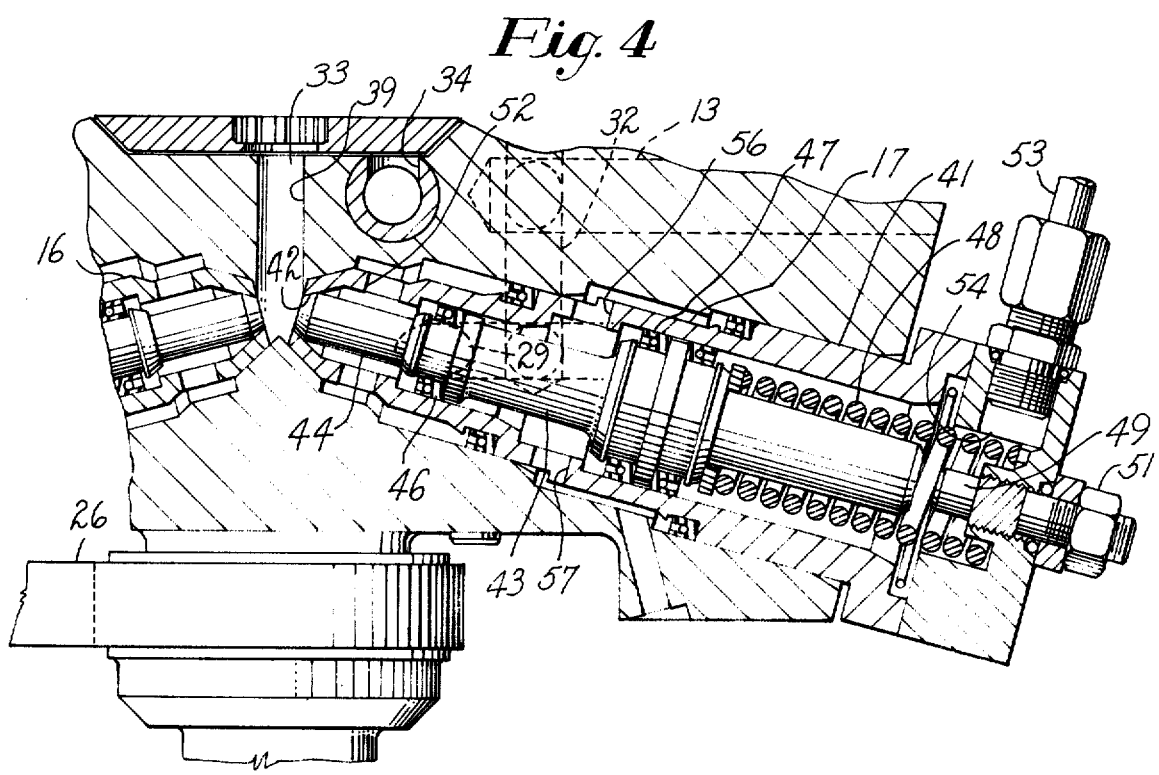
FIG. 4 is a fragmentary sectional view taken along the line III—III of FIG. 2 shown on an enlarged scale.

Referring now to FIG. 4, attention should be directed to the opening 33 into the mixing chamber 18 which is shown to lead directly from a tubular premix chamber 39 formed in the mix head 14. The premix chamber 39 is of substantially uniform circular cross section as it extends downwardly from the chamber 18 to a point of intersection with the transfer valves 16 and 17. It will be noted from FIGS. 2 and 4 that the valves 16 and 17 are set in the mix head such that they form an angle of substantially 120° with one another when viewed in the horizontal plane of FIG. 2, and substantially 150° with one another when viewed in a vertical plane as in FIG. 4. The opposed relationship of the valves 16 and 17 with respect to the chamber 39 is effective to cause impingement of the material flowing from the end of the valve openings into the chamber. The streams impinge one upon the other at substantially the centerline of the chamber and the impinged stream further mixes as it moves upwardly through the chamber 39, thereby causing impingement mixing of the materials prior to their entry into the mix chamber 18, through the opening 33. As each of the valves 16 and 17 is substantially of similar construction, only the valve 17 will be described in detail hereinbelow.

The valve 17 comprises a casing 41 which is set into the mix head 14, the casing 41 having tapered walls terminating into an opening 42 into the chamber 39. A valve spool 43 has a head portion 44 terminating in a tapered wall adjacent the opening 42 for mating engagement with the wall of the casing 41 in the valve closed condition. A seal ring 46 is engaged between two shoulder portions of the spool 43 near the forward end of the spool, and another seal ring 47 is likewise retained on the spool near its midpoint. A coil spring 48 is disposed between the rear wall of the casing 41 and a shoulder portion of the spool 43 in a state of compression which serves to bias the head portion 44 of the valve into sealing engagement with the wall of the casing 41. The coil spring 48 is chosen to exert a selected force on spool 43, which is determined by the pressure of the material adjacent the head portion 44 and area of the spool 43 over which it is exerted.

As is evident from the construction, the spool 43 is movable within the casing 41 from the position shown in FIG. 4 to a position wherein the rear portion of the spool contacts the stop member 49 threadedly engaged in the casing. The stop member 49 is adjustable by removing the nut 51 and turning the member in the threaded casing, and may be locked in a position which is desired to restrict movement of the spool 43 in the rearward direction.

From the foregoing description it will be observed that the casing 41 is divided into a first chamber located between the opening 42 and the seal ring 46, a second chamber defined by the seal ring 47 and the rear of the casing, and a third chamber formed between the seal rings 46 and 47.

Conduit 29 which is the extension of the feed line 13 through the head 14 terminates adjacent the forward end of the casing 41 and enters through an opening 52 near the head portion 44 of the spool 43. In the case of valve 17, the opening 52 provides polyisocyanate material from the tank 11 while the comparable opening in the valve 16 provides the polyhydroxyl material from tank 10 in a similar fashion.

Adjacent the rear of the valve 17 a fluid pressure line 53 provides hydraulic fluid under pressure through an opening 54 into the rear cavity of the casing 41 to maintain the valve in the closed position. Relief of the pressure in line 53 is effective to transfer control of forward movement of the spool 43 to the force exerted by the spring 48.

Between the seal ring 46 and the seal ring 47 there is formed an enclosed cavity having openings 56 and 57 provided in the casing 41. The openings 56 and 57 serve to vent pressure from the otherwise enclosed cavity, which would build up due to the different diameters of the casing having the seals 46 and 47 located therein. The openings 56 and 57 also serve to drain any material that might be leaked past the seal rings 46 and 47, which would collect and could impede movement of the valve spool 43.

Each of the valves 16 and 17 is so constructed as to provide an opening into the premix chamber 39 which is variable in area in response to changes in pressure of the respective ingredient flowing through the valve. For example, in the present construction the coil spring 48 is of sufficient spring constant to allow the spool 43 to contact its stop with a pressure of 500 p.s.i. at the head portion of the spool. In this condition the valves remain at their widest opening with a volume X pounds per minute of material flowing through the valves. However, should the volume rate of flow be reduced to one half X pounds per minute of material flowing into the valve 16 or 17, the pressure in the area of the valve head portion 44 would decrease by an amount which would unbalance the load on the spring 48 which would act to move the head portion 44 toward the opening 42 decreasing the area of flow through the nozzle at the opening 42 to stabilize the velocity of the impingement stream introduced into the premix chamber 39. As each of the valves 16 and 17 is constructed in substantially the same manner, the reliability of the effective premix taking place in the chamber 39 is of a high magnitude, due to this stabilized velocity of the impingement stream being maintained by the aforedisclosed structure.

In operation of the system, hydraulic pressure is maintained at the fluid pressure line 53 until the material to be introduced into the valve 16 or 17 is properly pressurized at the line 13, at which point in time the hydraulic pressure is relieved and startup of the premixing takes place at substantially an instantaneous desired velocity.

Figure 5:
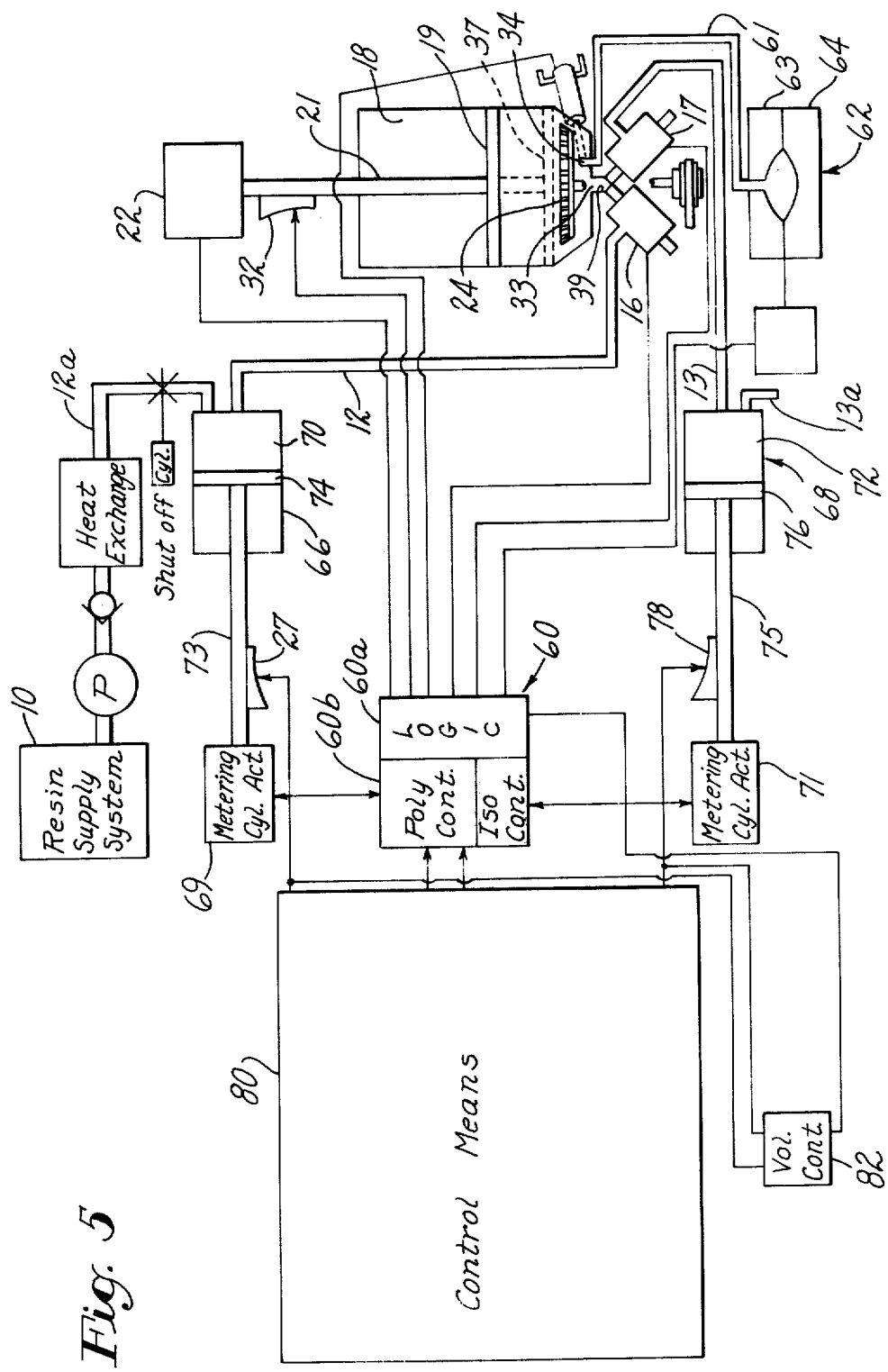
FIG. 5 is a schematic block diagram showing elements of the apparatus of FIG. 1 in schematic form.

The apparatus will be depicted in a system for use in dispending a multiple component material such as a polyurethane composition, such system being similar to that described in U.S. Pat. No. 3,794,301, assigned to the assignee of the present invention. Reference should be had to FIG. 5 wherein a typical operating system is shown to comprise the mixing chamber 18 preferably having a variable volume. Chamber 18 has disposed therein the piston 19 slidably disposed therein and connected to the piston rod 21. Piston 19 while slidably disposed in the chamber 18 is closely received therein so as to prevent the undesired escape of material being mixed therefrom.

The piston rod 21 is connected to actuator means for driving piston 19 in the form of the injection cylinder 22, and controlling the volume of chamber 18. Position sensing means such as the position transducer 23 may be operably connected to piston 19 as by being driven by the rod 21, to sense the position of the piston 19 with respect to the chamber 18. Actuator cylinder 22 as well as transducer 23 are operably connected to master control means 60, as indicated in block form. Master Control 60 for the illustrative polyurethane mixing is divisable into three basic control functions as indicated, being: Mixer Logic section, a first component control section and a second polyisocyanate component control section.

As discussed above, adjacent the bottom of the chamber 18 is the inlet opening 33 leading from the premix chamber 39. The transfer valves 16 and 17 are disposed as described above for impingement mixing of materials in the premix chamber. Extending centrally (preferably) of the end of mixing chamber 18, opposite piston 19, is the outlet opening 34, controllable by the sprue valve rod 37. Mounted in the chamber 18, generally adjacent inlet opening 33 and opening 34 is stirring means in the form of impeller 24. Conveniently, impeller 24 may be a propeller-like device for agitating the constituent components being supplied in premixed form to chamber 18 through opening 33. As illustrated, valves 16 and 17 and sprue valve rod 37 are operably connected to control 60 to be controlled thereby for proper sequencing of mixing and dispensing.

Outlet opening 34 is connected through conduit means 61 to a receptacle 62 for the mixed product of chamber 18. In the illustrative embodiment, receptacle 62 includes mold means 63 having a molding cavity 64 therein. The transfer valves 16 and 17 are connected through feed lines 12 and 13 respectively to first and second component metering means 66 and 68 respectively. It is to be understood that a variety of means such as continuous or intermittent pumps as those shown could be used to supply ingredients from bulk supplies to metering means 46 and 48 which comprise cylinders 70 and 72 having metering pistons 74 and 76 closely received, but slidably disposed therein. Metering pistons 74 and 76 may be motivated by rod means 73 and 75 through actuator means 69 and 71. In the illustrated embodiment, metering cylinder 70 may supply the polyhydroxyl component of the polyurethane compound to be formed in chamber 10, and cylinder 72 may supply the isocyanate component. Component metering means 66 and 68 include sensing means capable of generating a control signal directly related to the metered component delivered to the mixing chamber 18. In the instance of the illustrated metering cylinders 70 and 72, position transducers 77 and 78 on polyhydroxyl and isocyanate piston rods 73 and 75 respectively supply an indication of piston 74, 76 location and thus, of the rate or volume component material supplied by each of the means 66, 68.

Actuator means 69 and 71 may conveniently be hydraulically or electrically powered devices such as hydraulic or electrical motors (rotary or reciprocating), controllable through the master control means 60 as indicated in FIG. 5. A wide variety of control means are commercially available and known to those skilled in the art which may be selected and combined with the invention to provide the function subsequently described, in addition to those shown and described in the aforementioned U.S. Pat. No. 3,794,301.

Master control means 60 may be functionally divided into logic section 60a which orders and controls the sequence of function of the illustrated mixing and dispensing apparatus, and metering control section 60b. Metering control section 60b serves to direct the operation of metering means 66, 68 through actuators 69, 71. Thus section 60b is divided into first component (polyhydroxyl) control section and second component (polyisocyanate) control section.

Master control 60 may be programmed for the illustrative apparatus mechanically, electrically and/or hydraulically to cause the polyhydroxyl component and isocyanate component to be metered from cylinders 70, 72 through conduits 12 and 13, into valves 16, 17 and into impingement mixing contact in chamber 39. As chamber 39 becomes filled, material flows through inlet opening 33 into chamber 18 where mixing is performed by impeller 24. Ratio control means 80 functions to instruct control 60 of the preselected relative proportion of the component materials to be supplied and to maintain the proper ratio of components during the premixing, mixing and dispensing cycle. The elements and functions of means 80 to perform this proportioning will be described in detail subsequently.

In the present embodiment, the material is provided from either the tank 10 or 11 through an arrangement which may include valving, a pressure pump and heat exchanger as shown connected into line 12a. As these components do not perform a unique function in the operation of the present invention, they will not be further described in detail.

In the typical operating cycle, mixing chamber 18 may supply mold cavity 64 with a shot of polyurethane forming material, then rest until a subsequent molding operation is ready to be performed. During such rest period, the filled mold might be opened, emptied and prepared for a subsequent shot immediately or, the molding machine might be equipped with a plurality of mold stations, and a prepared station cycled into operative engagement with the mixing chamber. U.S. Pat. No. 3,632,022 is illustrative of such apparatus. It is also possible to use the apparatus in an extended operating cycle such as for the extrusion of a mixed material.

During the sequential operation of chamber 18 to fill subsequent molds with a polyurethane forming composition, the chamber starts from a "rest" condition. In normal operating sequence, chamber 18 in the rest condition contains a residuum of material, being the remnants (subsequently described) of a previous mixing cycle. In this condition piston 19 is in a position providing a volume to accommodate the residuum of material. In the illustrated apparatus this residuum may be rich in polyhydroxyl component ingredient.

When a mold 63 is ready for a shot, a mold actuator 82 signals control of the mold's readiness. Control 60 then actuates metering means 68 through control 60b and actuator 71 to supply a quantity of isocyanate component ingredient through conduit 13 and to the valve 17, and after a short time delay hydraulic pressure is released from the line 53 to allow the valve to open. This component is supplied in a quantity calculated to bring the polyhydroxyl rich residuum back to the relative proportion for controlled reaction. Concurrent with the addition of polyisocyanate component ingredient, control 60 enables chamber 18 to increase its volume by raising piston 19, as by signaling actuator 22 and moving rod 21 or by allowing the incoming material to flow through premix chamber 39 and into chamber 18 to force piston 19 upward. Transducer 23 signals the travel of piston rod 21 and control 60 interrupts the actuation of actuators 22 and 71 when the mixture in chamber 18 is returned to a properly proportioned mixture.

Control 60 then actuates ratio control means 80 which signals concurrent supply of component ingredients to chamber 18. Control means 60b initiates the metering of components from means 66, 68 through conduits 12, 13 and hydraulic pressure maintaining valve 16 is relieved to initiate impingement mixing in the premix chamber 33. Control 60 has now concurrently opened valves 16 and 17 (17 may already be open from the previous step) and coordinately the premixed material increases the value of chamber 18 to accommodate the increasing volume of the mix (sprue valve 37 remaining closed). With the initial opening of the valve 17, the impeller 24 begins rotational operation, whereby impingement and agitator mixing are being concurrently carried out in the mix head during subsequent operation of valves 16 and 17. Ratio control means 80, from the moment of actuation by control 60, receives the quantity information of component ingredients metered as measured by transducers 77, 78 and computes ratio information which is supplied to controls 60b. These controls cause the metering means 66, 68 to bring the mixture "on ratio" (if not at the preselected value) and supplies a signal to control 60 when this condition is reached (zero error indication).

Once control 60 receives the on-ratio or zero error indication, the mixture in chamber 18 is ready to begin being dispensed into mold cavity 64. Sprue valve 37 is opened by control 60 and the reacting, polyurethane forming mixture is injected into cavity 64. Metering means 66, 68 continue to supply component ingredients, at proper ratio as controlled by means 80, through control 60b and actuators 69, 71. Control 60 adjusts the volume of chamber 18 to an optimum mixing volume for the concurrent mixing and dispensing of material.

A volume control means 82 monitors the amount of component materials supplied to chamber 18 in the illustrated embodiment by observing the movement of pistons 74, 76 (by rods 73, 75 and transducers 77, 78). The computed total quantity of component ingredients supplied is compared to a preselected total quantity (shot size) and when this value is reached, the master control 60 observes the event. Master control 60 may then signal shutoff of component materials (introducing hydraulic pressure into the lines 53 of the valves 16 and 17, closing valves 16, 17 and terminating the metering of components by means 66, 68).

In the preferred embodiment, control 60 anticipates the completion of the supply of material to mold cavity 64 approaching the conclusion of the dispensing cycle. Control means causes the volume of material still remaining within chamber 18 to be reduced to a predetermined nominal level, insofar as is practical, to evacuate the chamber 18 of the reacting, mixing polyurethane forming components. Control 60, through actuator 22, causes the advance of piston 19 toward outlet opening 34. Once piston 19 has "bottomed out" (reached the predetermined advanced position indicated by dotted lines in FIG. 5) the dispensing or injection into mold 63 is complete. Sprue valve 37 is ordered closed.

Since there is a residuum of reacting polyurethane forming material remaining within chamber 18, control 60 is programmed to dilute the residuum mixture to quench the polyurethane forming rection. In the illustrated embodiment, at the completion of injection, a predetermined quantity of polyhydroxyl component is supplied by metering means 66 through opened valve 16 and the premix chamber 39. Concurrently, control 60 increases the volume of chamber 18 to accommodate the dilution of the residuum.

In the disclosed device, prior to entering the mix chamber, the two components have impinged upon each other at up to 3000 psi metering pressure. This action is effective to generate sufficient turbulence to cause a great deal of mixing to occur, especially if the two components are very low in viscosity.

As the impingement mixed components come into the mix chamber, they encounter the turbine blade impeller 24 which creates a vortex flow mixing action. Cavitation in the mixer is prevented by maintaining a back pressure on the piston 19 which will later serve to inject the last part of the shot, which remains in the mixer after metering has occurred, into the mold. Whereas impingement mixing allows for most of the high rate mixing of low viscosity polymers, the impeller 24 serves to finish mix low viscosity systems and to be the primary mixer of higher viscosity or filled polymers.

The impeller 24, being of adjustable speed, can be controlled to provide a greater or lesser proportion of the mix energy to the constituent materials. For example, with low viscosity systems the impeller 24 may be operated at low speeds, e.g., 3000 rpm or in some cases not at all. With increasing mix requirement, the impeller 24 could be adjusted up to its full speed of 11,000 rpm in the present embodiment.

A further advantage of the combination becomes evident in the behavior of the system if the discharge rate through the system is "programmed" or adjusted to vary during the cycle. In this mode of operation, during the slower portion the effects of impingement mixing are reduced substantially proportionately to the reduced flow rate. However, the effects of the impeller mixing are increased substantially proportionately to the reduced flow rate. Conversely, at high rates the impingement effects are increased and the impeller effects are decreased. These opposing technical factors tend to keep the level of mix at a constant regardless of discharge rate.

From the foregoing description, it will be understood that the present invention achieves the various objects set forth by providing a dual stage mixing head which is adaptable to a wide range of material of varying viscosities and constituents.

What is claimed is:

1. Apparatus for mixing and dispensing a multicomponent composition formed by at least two component ingredients comprising wall structure defining a mixing chamber, impeller means disposed within said chamber for mixing the ingredients by rotation thereof, wall structure forming a separate premix chamber interconnected with said mixing chamber, first means for introducing one of said component ingredients into said premix chamber under pressure, and second means for introducing another of said component ingredients into said premix chamber under pressure, said first and second means for introducing the ingredients into said premix chamber being substantially aligned toward a common point near the center of said premix chamber to cause said ingredients to impinge one on the other near the center of said chamber to provide intermixing of said ingredients by said impingement.

2. The apparatus of claim 1 wherein each of said means for introducing component ingredients into said premix chamber comprises a valve having an opening directed into said premix chamber, said opening being variable in area in response to change in pressure of the respective ingredient flowing through said valve.

3. The apparatus of claim 1 wherein said premix chamber enters directly into said mixing chamber and said component ingredients are fed into said mixing chamber by the pressures exerted thereon by said means for introducing component ingredients into said premix chamber.

4. The apparatus of claim 1 which further includes means for varying the volume of said mixing chamber and means controlling said varying means to cause said chamber volume to correspond to the volume of ingredients being fed thereto from said premix chamber.

5. Apparatus for mixing and dispensing a multicomponent composition formed by at least two component ingredients comprising wall structure defining a variable volume mixing chamber, impeller means disposed within said chamber for mixing the ingredients by rotation thereof, wall structure forming a separate premix chamber disposed adjacent the bottom of said mixing chamber and opening into said mixing chamber below said impeller means, first means for introducing one of said component ingredients into said premix chamber under pressure, second means for introducing another of said component ingredients into said premix chamber under pressure, said first and second means for introducing ingredients into said premix chamber being substantially aligned toward a common point near the center of said premix chamber to cause said ingredients to impinge one on the other near the center of said chamber to provide intermixing of said ingredients by said impingement.

6. The apparatus of claim 5 wherein each of said means for introducing component ingredients into said premix chamber comprises a valve having an opening directed into said premix chamber, said opening being variable in area in response to change in pressure of the respective ingredient flowing through said valve.

7. The apparatus of claim 6 wherein said component ingredients are fed upwardly into said mixing chamber only by the pressure exerted thereon by ingredient flow through the variable openings in each of said valves.

8. The apparatus of claim 7 which further includes means for varying the volume of said mixing chamber and means for controlling said varying means to cause said chamber volume to correspond to the volume of ingredients being fed thereto from said premix chamber.

9. A mixing head for use in dispensing a multicomponent composition formed by at least two component ingredients and comprising a base member having at least a portion of a cylindrical mix chamber formed thereon, a separate cylindrical premix chamber formed in said base member adjacent said mix chamber and a passage formed between said premix chamber and said mix chamber terminating in an inlet opening in said mix chamber, first means disposed in said base member for introducing one of said component ingredients into said premix chamber under pressure, and second means for introducing another of said component ingredients into said premix chamber under pressure, said first and second means for introducing the ingredients into said premix chamber being substantially aligned toward a common point near the center of said premix chamber to cause said ingredients to impinge one on the other near the axial centerline of said cylindrical premix chamber to provide intermixing of said ingredients by said impingement.

10. A mixing head as set forth in claim 9 wherein each of said means for introducing component ingredients into said premix chamber comprises a valve mounted in a passageway formed in said base and having an opening directed into said premix chamber.

11. A mixing head as set forth in claim 10 wherein each of said openings directed into said premix chamber is variable in area in response to change in pressure of the respective ingredient flowing through said valve.

12. A mixing head as set forth in claim 11 wherein said cylindrical mix chamber is of a greater diameter than said cylindrical premix chamber.

13. A method of mixing and dispensing a multicomponent material wherein the component ingredients are supplied in measured relative proportions comprising the steps of:

metering a first component ingredient to a first opening into a substantially enclosed premix chamber under pressure, metering a second component ingredient to a second opening into the premix chamber under pressure, aligning said openings to cause said ingredients to impinge one on the other near the center of the chamber to provide intermixing of the ingredients, transferring the partially mixed ingredients into a mixing chamber and finishing mixing the ingredients by agitation in the mixing chamber prior to dispensing the material therefrom during a mixing and dispensing cycle.

14. A method as set forth in claim 13 wherein the component ingredients are caused to impinge one on the other at a substantially constant velocity.

15. A method as set forth in claim 14 wherein the metering, mixing by impingement in the premix chamber, and mixing by agitation in the mixing chamber are carried out concurrently with the dispensing of mixed material from the mixing chamber.

16. A method as set forth in claim 13 wherein said first and second component ingredients are metered to said premix chamber relatively concurrently and wherein the ingredients are metered to said premix chamber in controlled volumes to maintain the relative proportions of ingredients at a predetermined standard during a mixing and dispensing cycle.

17. A method as set forth in claim 16 wherein the mixed materials are reaction producing and are intermittently dispensed in measured quantity to a mold and wherein after dispensing a quantity of material to a mold during a mixing and dispensing cycle there is included the step of diluting the relative proportions of the ingredients remaining in said mixing chamber and said premix chamber by metering only one of said constituent ingredients in a predetermined quantity into the premix chamber and to said mix chamber to quench the reaction of material remaining in both said premix chamber and said mixing chamber.

18. A method as set forth in claim 17 wherein each of the component ingredients is caused to impinge on the other at a substantially constant velocity during a mixing and dispensing cycle.

19. Mixing and dispensing apparatus as set forth in claim 1 wherein said impeller is disposed adjacent one end of said mixing chamber and said means interconnecting said premix chamber and said mixing chamber comprises an inlet opening formed in said mixing chamber wall structure in said mixing chamber end, and further comprising an outlet opening formed in said mixing chamber wall structure in said mixing chamber end, whereby material entering and leaving said mixing chamber is directed through said impeller means.

20. Apparatus as set forth in claim 5 which further comprises an outlet opening formed in said wall structure below said impeller means.

21. A mixing head as set forth in claim 9 wherein said inlet opening is located at one end of said mix chamber and further comprising an outlet opening formed in said base member at said one end of said mix chamber and an impeller disposed in said mix chamber adjacent said mix chamber end.

22. The method of claim 13 wherein the mixing chamber contains an impeller means for agitation of the ingredients and wherein the partially mixed ingredients are directed through the impeller during transfer into the mixing chamber, and further including the step of dispensing the mixed ingredients from the mixing chamber substantially through the impeller.

* * * * *